US011344049B2

(12) United States Patent
    Lim

(10) Patent No.: US 11,344,049 B2
(45) Date of Patent: May 31, 2022

(54) SUSHI COMPOSITION

(71) Applicant: Seong Kwon Lim, Goyang-si (KR)

(72) Inventor: Seong Kwon Lim, Goyang-si (KR)

( * ) Notice: Subject to any disclaimer, the term of this patent is extended or adjusted under 35 U.S.C. 154(b) by 0 days.

(21) Appl. No.: 17/429,705

(22) PCT Filed: Oct. 16, 2020

(86) PCT No.: PCT/KR2020/014162
    § 371 (c)(1),
    (2) Date: Aug. 10, 2021

(87) PCT Pub. No.: WO2021/125530
    PCT Pub. Date: Jun. 24, 2021

(65) Prior Publication Data
    US 2022/0039442 A1     Feb. 10, 2022

(30) Foreign Application Priority Data
    Dec. 16, 2019 (KR) .......................... 10-2019-0168348

(51) Int. Cl.
    *A23L 17/10*     (2016.01)
    *A23L 7/196*     (2016.01)
    (Continued)

(52) U.S. Cl.
    CPC ............... *A23L 7/1963* (2016.08); *A23L 3/44* (2013.01); *A23L 13/10* (2016.08); *A23L 17/10* (2016.08);
    (Continued)

(58) Field of Classification Search
    CPC .......... A23L 7/1963; A23L 3/44; A23L 17/10; A23L 2/00; A23L 13/03–13/10;
    (Continued)

(56) References Cited

U.S. PATENT DOCUMENTS 2,713,003 A * 7/1955 Rivoche ................. A23L 3/405
                                                  426/524
3,395,024 A * 7/1968 Earle ..................... A23P 20/105
                                                  426/291
(Continued)

FOREIGN PATENT DOCUMENTS

KR  10-2017-0085790 A   7/2017
KR  10-2018-0029185 A   3/2018
(Continued)

OTHER PUBLICATIONS

Translation of JP 2017212966A (Year: 2017).*
(Continued)

*Primary Examiner* — Drew E Becker
(74) *Attorney, Agent, or Firm* — Sughrue Mion, PLLC

(57) ABSTRACT

The present invention relates to a sushi composition, and more specifically, to a sushi composition which includes a sushi layer, a sauce layer formed on an upper surface of the sushi layer, and a powder layer formed on a lower surface of the sushi layer, wherein the sushi layer consists of a filling made of a protein component and a sushi mixture covering the filling. The sushi composition has excellent taste and texture, contains abundant nutrients, and exhibits excellent preservation by applying various ingredients in the form of a sauce or powder.

1 Claim, 2 Drawing Sheets

(51) Int. Cl.
*A23L 13/10* (2016.01)
*A23L 23/00* (2016.01)
*A23P 20/10* (2016.01)
*A23L 3/44* (2006.01)
*C12J 1/00* (2006.01)

(52) U.S. Cl.
CPC .............. *A23L 23/00* (2016.08); *A23P 20/10* (2016.08); *C12J 1/00* (2013.01); *A23V 2002/00* (2013.01)

(58) Field of Classification Search
CPC .. A23L 17/00–17/75; A23P 20/10; C12J 1/00; A23V 2002/00; A23B 4/037
See application file for complete search history.

(56) References Cited

U.S. PATENT DOCUMENTS

| | | | | |
|---|---|---|---|---|
| 5,795,606 | A * | 8/1998 | Lapre | A23P 10/30 426/293 |
| 2012/0177787 | A1* | 7/2012 | Mizuno | A23B 4/06 426/92 |
| 2017/0143018 | A1* | 5/2017 | Van De Velde | A23L 7/1965 |

FOREIGN PATENT DOCUMENTS

| | | | |
|---|---|---|---|
| KR | 10-2019-0006355 | A | 1/2019 |
| KR | 10-2021722 | B1 | 9/2019 |
| KR | 10-2028909 | B1 | 10/2019 |
| KR | 10-2161191 | B1 | 10/2020 |

OTHER PUBLICATIONS

Translation of KR 102021722B1 (Year: 2019).*
Translation of KR 20140147467A (Year: 2014).*
Translation of JP 61209559A (Year: 1986).*
"Rice balls with tuna and mayonnaise filling coated with dried sweet laver", Naver blog, Aug. 30, 2018, 12pages.
Korea Intellectual Property Office Decision to Grant Patent for KR 10-2019-0168348 dated Sep. 17, 2020.
Korea Intellectual Property Office Decision of Rejection for KR 10-2019-0168348 dated Aug. 31, 2020.
International Search Report for PCT/KR2020/014162 dated Jan. 27, 2021 [PCT/ISA/210].

* cited by examiner

SUSHI COMPOSITION

CROSS-REFERENCE TO RELATED APPLICATION

This application is a National Stage of International Application No. PCT/KR2020/014162 filed Oct. 16, 2020, claiming priority based on Korean Patent Application No. 10-2019-0168348 filed Dec. 16, 2019, the entire disclosures of which are incorporated herein by reference.

BACKGROUND

1. Field of the Invention

The present invention relates to a sushi composition, and more specifically, to a sushi composition which has excellent taste and texture, contains abundant nutrients, and exhibits excellent preservation by applying various ingredients in the form of a sauce or powder.

2. Discussion of Related Art

Sushi is a typical Japanese dish made by molding sushi rice into a bite-sized lump and then putting various food ingredients on the lump. Sushi rice used in sushi is made by adding seasonings including vinegar, sugar, and salt to properly cooked white rice. In this case, the vinegar is added to delay the decomposition of food ingredients, the sugar is added to neutralize the sourness of vinegar, and the salt is added to boost the flavor of sushi rice and food ingredients.

Conventionally, most of the food ingredients put on sushi rice are raw, and the preservation of sushi rice is maintained by mixing with vinegar whereas food ingredients put on sushi rice degrade the preservation of sushi.

Meanwhile, the types of sushi vary depending on the types of used ingredients. Since the types of ingredients used in sushi are almost the same, the sushi of sushi restaurants is not significantly differentiated. Recently, as consumers' expectations for well-being increase, there is a demand for sushi that has reduced calories but is sufficiently filled with key nutrients.

RELATED-ART DOCUMENTS

Patent Documents (Patent Document 0001) Korean Laid-Open Patent Publication No. 10-2018-0029185 (2018.03.20)
(Patent Document 0002) Korean Laid-Open Patent Publication No. 10-2019-0006355 (2019.01.18)

SUMMARY OF THE INVENTION

An objective of the present invention is to provide a sushi composition which has excellent taste and texture, contains abundant nutrients, and exhibits excellent preservation by applying various ingredients in the form of a sauce or powder.

A sushi composition of the present invention includes a sushi layer, a sauce layer formed on an upper surface of the sushi layer, and a powder layer formed on a lower surface of the sushi layer, wherein the sushi layer consists of a filling made of a protein component and a sushi mixture covering the filling.

According to a preferred feature of the present invention, the protein component may consist of one or more selected from the group consisting of fish, meat, and tofu.

According to a more preferred feature of the present invention, the sushi mixture may consist of 100 parts by weight of a rice mix and 10 to 20 parts by weight of a sushi vinegar sauce.

According to an even more preferred feature of the present invention, the rice mix may consist of 100 parts by weight of white rice and 50 to 150 parts by weight of konjac rice.

According to an even more preferred feature of the present invention, the sushi vinegar sauce may consist of 100 parts by weight of vinegar, 10 to 12 parts by weight of salt, 60 to 70 parts by weight of sugar, 10 to 20 parts by weight of citron juice, 5 to 10 parts by weight of kelp, 1 to 3 parts by weight of turmeric powder, and 1 to 3 parts by weight of cumin powder.

According to an even more preferred feature of the present invention, the sushi vinegar sauce may further contain a *Boehmeria nivea* extract in an amount of 1 to 3 parts by weight relative to 100 parts by weight of the vinegar.

According to an even more preferred feature of the present invention, the sauce layer may contain sodium alginate and calcium chloride.

According to an even more preferred feature of the present invention, the powder layer may be made of an ingredient powdered after freeze drying.

According to an even more preferred feature of the present invention, the freeze drying is performed at 30 to 40° C. for 40 to 48 hours after an ingredient is subjected to quick freezing at −55 to −45° C.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
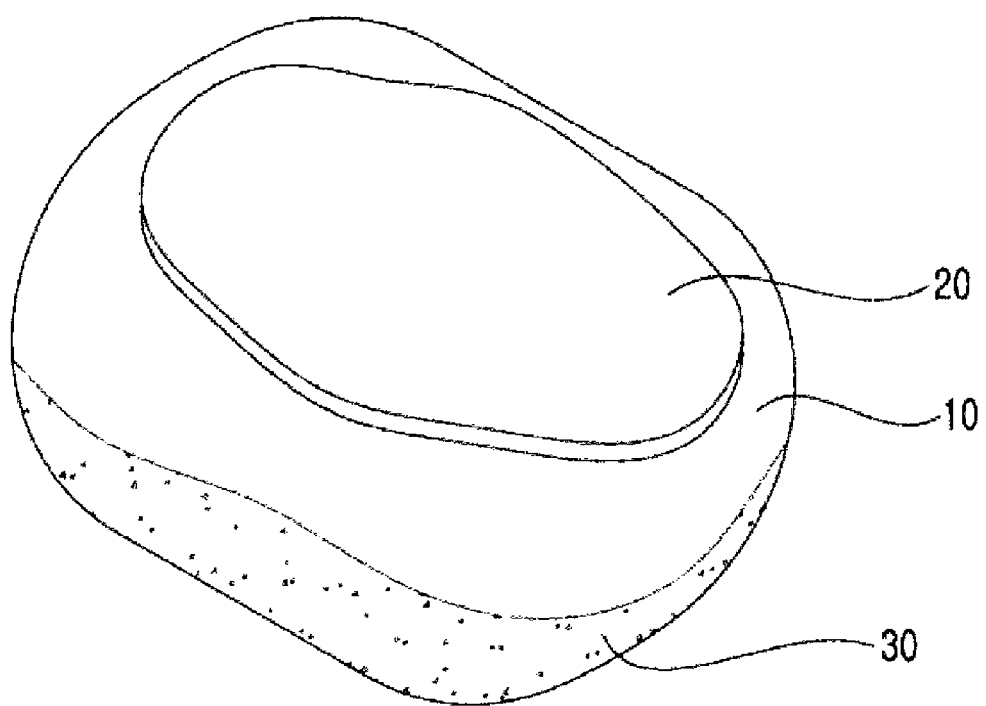
FIG. 1 is a perspective view of a sushi composition according to the present invention.
Figure 2:
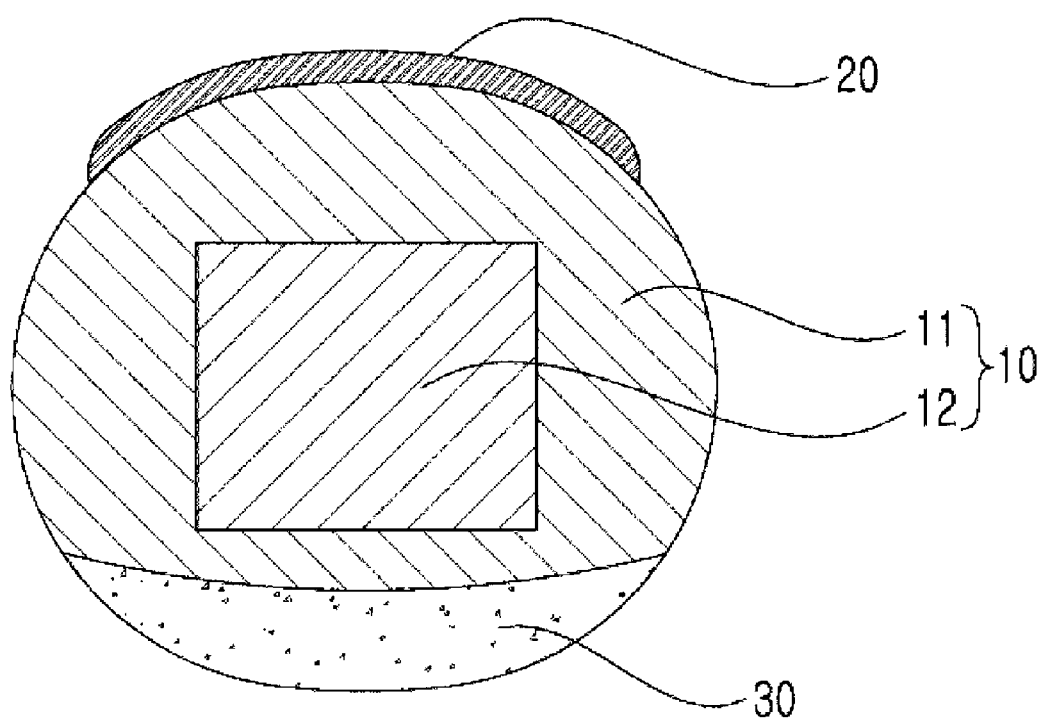
FIG. 2 is a cross-sectional view of a sushi composition according to the present invention.

Hereinafter, exemplary embodiments of the present invention and the properties of each component will be described in detail, which is intended to describe in detail enough that those skilled in the art to which the present invention pertains can easily carry out the invention, not to limit the technical spirit and scope of the present invention.

A sushi composition according to the present invention includes a sushi layer 10, a sauce layer 20 formed on an upper surface of the sushi layer 10, and a powder layer 30 formed on a lower surface of the sushi layer 10.

The sushi layer 10 consists of a filling 12 made of a protein component and a sushi mixture 11 covering the filling 12, and the filling 12 is preferably made of a protein component, and more preferably, one or more selected from the group consisting of fish, meat, and tofu.

When the filling 12 made of a protein component is covered with the sushi mixture 11 as described above, the deterioration of the filling 12 is suppressed due to vinegar and the like contained in the sushi mixture 11, and thus the preservation of the sushi composition may be enhanced.

In addition, the sushi mixture 11 consists of 100 parts by weight of a rice mix and 10 to 20 parts by weight of a sushi vinegar sauce.

The rice mix preferably consists of 100 parts by weight of white rice and 50 to 150 parts by weight of konjac rice. When the rice mix consisting of white rice and konjac rice is used, the calories of sushi may decrease, and a lot of dietary fiber may be contained, as compared to when only white rice is used.

The konjac rice consists of about 97% moisture and 3% carbohydrates, has very low calories of 6 kcal per 100 g, and contains a lot of dietary fiber.

In addition, the sushi vinegar sauce preferably consists of 100 parts by weight of vinegar, 10 to 12 parts by weight of salt, 60 to 70 parts by weight of sugar, 10 to 20 parts by weight of citron juice, 5 to 10 parts by weight of kelp, 1 to 3 parts by weight of turmeric powder, and 1 to 3 parts by weight of cumin powder.

The sushi vinegar sauce used in the present invention further contains turmeric powder and cumin powder unlike a typical sushi vinegar sauce.

Turmeric (*Curcuma longa*) is a perennial plant belonging to the order Zingiberales and is mainly cultivated in tropical and subtropical regions centered on India. The stem and root thereof are used for food, medicinal purposes, and the like and are effective in promoting blood circulation and improving dyspepsia by helping lipolysis and biligenesis.

In particular, curcumin contained in turmeric powder is able to solve a problem such as dyspepsia caused by konjac rice. When the content of the turmeric powder is less than 1 part by weight, the above effect may be insignificantly exhibited, and when the content of the turmeric powder exceeds 3 parts by weight, the palatability of the sushi composition may be degraded while not significantly exhibiting the above effect.

In addition, cumin (*Cuminum cyminum* L) is an annual plant belonging to the family Apiaceae, contains cuminaldehyde as a major component, and is mainly used as a unique and strong spice. Since cumin powder contains large amounts of vitamins (A, C, E, K), vitamin B (B1, B2, B3, B6, B12), iron, calcium, folic acid, magnesium, sodium, and potassium, it is able to enhance not only the palatability of sushi but also the content of nutrients.

When the content of the cumin powder is less than 1 part by weight, the above effect may be insignificantly exhibited, and when the content of the cumin powder exceeds 3 parts by weight, the palatability of the sushi composition may be degraded.

In addition, the sushi vinegar sauce may further contain a *Boehmeria nivea* extract in an amount of 1 to 3 parts by weight relative to 100 parts by weight of the vinegar, and the *Boehmeria nivea* extract is prepared by mixing 3 to 7 parts by weight of *Boehmeria nivea* with 100 parts by weight of water, heating the mixture at 90 to 100° C. for 5 to 10 minutes, and removing a solid content.

The *Boehmeria nivea* extract prepared by the above process serves to maintain the chewy texture of the sushi layer, thereby providing a sushi composition exhibiting excellent texture for a long period of time. When the content of the *Boehmeria nivea* extract is less than 1 part by weight, the above effect may be insignificantly exhibited, and when the content of the *Boehmeria nivea* extract exceeds 3 parts by weight, the taste of the sushi composition may be degraded while not significantly exhibiting the above effect.

The sauce layer 20 is formed on an upper surface of the sushi layer 10 and is made by crushing various ingredients that can be applied to sushi and mixing the crushed ingredients with sodium alginate and calcium chloride.

When sodium alginate and calcium chloride are contained as described above, sodium alginate and calcium chloride react to form calcium alginate in the form of a gel, and the crushed ingredient remains in the form of a sauce in the structure of the gel-type calcium alginate, and thus a sushi composition that still has the taste and chewy texture of the ingredient while suppressing the crushed ingredients from being dried or hardened may be provided.

In this case, the ingredient is prepared by finely crushing fish flesh, roe, shellfish flesh, rolled omelet, shrimp flesh, meat, and the like and then mixing the crushed ingredient with sodium alginate and calcium chloride.

The powder layer 30 is formed on a lower surface of the sushi layer 10 and is made of an ingredient powdered after freeze drying. Various ingredients that can be commonly applied to sushi are used after being subjected to freeze drying and then powdering.

In this case, as the ingredient that can be applied to the powder layer 30, fish flesh, roe, shellfish flesh, rolled omelet, shrimp flesh, meat, and the like may be used, and the ingredient is subjected to freeze drying by a typical freeze-drying process and then powdering. More specifically, the ingredient is subjected to quick freezing at −55 to −45° C. and then input into a freeze dryer, the temperature of the freeze dryer is raised to 30 to 40° C., and the quickly frozen ingredient is subjected to freeze drying for 40 to 48 hours and then powdering.

The ingredient having been subjected to freeze drying and powdering by the above process easily adheres to the sushi mixture 11 of the sushi layer 10 and thus fixed.

In addition, the ingredient having been subjected to freeze drying and powdering by the above process may minimize the loss of aromatic materials, nutrition, taste, smell, and the like, which occurs during a moisture evaporation process, and the freeze-dried and powdered ingredient may be effective in restoring the taste and smell of the ingredient applied to the powder layer 30 due to a rehydration phenomenon when coming in contact with konjac rice contained in the sushi mixture 11 of the sushi layer 10.

Hereinafter, a method of preparing the sushi composition according to the present invention and the properties of a sushi composition prepared by the method will be described with reference to examples.

<Preparation Example 1> Preparation of Rice Mix 100 parts by weight of white rice was mixed with 100 parts by weight of konjac rice, and the mixture was steamed to prepare a rice mix.

<Preparation Example 2> Preparation of Sushi Vinegar Sauce 100 parts by weight of vinegar, 11 parts by weight of salt, 65 parts by weight of sugar, 15 parts by weight of citron juice, 8 parts by weight of kelp, 2 parts by weight of turmeric powder, and 2 parts by weight of cumin powder were mixed to prepare a sushi vinegar sauce.

<Preparation Example 3> Preparation of Sushi Mixture 100 parts by weight of the rice mix prepared in Preparation Example 1 was mixed with 15 parts by weight of the sushi vinegar sauce prepared in Preparation Example 2 to prepare a sushi mixture.

<Preparation Example 4> Preparation of Sauce Layer Ingredient

The flesh of flatfish was crushed, and 100 parts by weight of the crushed flatfish flesh was mixed with 10 parts by weight of sodium alginate and 10 parts by weight of calcium chloride to prepare a sauce layer ingredient.

<Preparation Example 5> Preparation of Powder Layer Ingredient

Flying fish roe was subjected to quick freezing at −50° C. and then freeze drying at 35° C. for 44 hours, and then the resulting roe was crushed to prepare a powder layer ingredient.

<Preparation Example 6> Preparation of Sushi 100 parts by weight of white rice was steamed, and 100 parts by weight of the steamed white rice was mixed with 15 parts by weight of a sushi vinegar sauce (consisting of 100 parts by weight of vinegar, 11 parts by weight of salt, 65 parts by weight of sugar, 15 parts by weight of citron juice, and 8 parts by weight of kelp) to prepare sushi.

Example 1

30 parts by weight of chub mackerel flesh was covered with 100 parts by weight of the sushi mixture prepared in Preparation Example 3 to prepare a sushi layer, the sauce layer ingredient prepared in Preparation Example 4 was applied onto an upper surface of the sushi layer, and the flying fish roe powder prepared in Preparation Example 5 was applied onto a lower surface of the sushi layer, thereby preparing a sushi composition.

Example 2

A sushi composition was prepared in the same manner as in Example 1, except that eye of round beef was used instead of chub mackerel flesh.

Example 3

A sushi composition was prepared in the same manner as in Example 1, except that tofu was used instead of chub mackerel flesh.

Comparative Example 1

30 parts by weight of chub mackerel flesh was put on an upper surface of 100 parts by weight of the sushi prepared in Preparation Example 6 to prepare a sushi composition.

Comparative Example 2

30 parts by weight of eye of round beef was put on an upper surface of 100 parts by weight of the sushi prepared in Preparation Example 6 to prepare a sushi composition.

Comparative Example 3

30 parts by weight of tofu was put on an upper surface of 100 parts by weight of the sushi mixture prepared in Preparation Example 6 to prepare a sushi composition.

The taste, smell, texture, and overall palatability of the sushi compositions prepared according to Examples 1 to 3 and Comparative Examples 1 to 3 were examined, and results thereof are shown in the following Table 1.

{In this case, the taste, smell, texture, and overall palatability of the sushi composition were expressed as average values after 20 subjects were surveyed using a 5-point scale method.

5 points: very good, 4 points: good, 3 points: fair, 2 points: poor, and 1 point: very poor}

TABLE 1

| Classification | Taste | Texture | Smell | Overall palatability |
| --- | --- | --- | --- | --- |
| Example 1 | 4.7 | 4.8 | 4.6 | 4.7 |
| Example 2 | 4.8 | 4.9 | 4.6 | 4.8 |
| Example 3 | 4.4 | 4.7 | 4.5 | 4.6 |
| Comparative Example 1 | 4.3 | 4.4 | 4.5 | 4.4 |
| Comparative Example 2 | 4.4 | 4.5 | 4.6 | 4.4 |
| Comparative Example 3 | 3.9 | 3.8 | 4.2 | 4.0 |

As shown in Table 1, in the case of the sushi compositions prepared according to Examples 1 to 3 of the present invention, it can be seen that taste and texture were substantially enhanced as compared to the sushi compositions prepared according to Comparative Examples 1 to 3.

In addition, the preservation of the sushi mixtures prepared according to Examples 1 to 3 and Comparative Examples 1 to 3 was determined, and results thereof are shown in the following Table 2.

{In this case, preservation was determined by confirming whether texture and smell deteriorated immediately after a sushi composition was prepared and after 12 hours, 24 hours, and 48 hours had elapsed at room temperature.}

TABLE 2

| | | Elapsed time | | |
| --- | --- | --- | --- | --- |
| Classification | Initial | 12 hours | 24 hours | 48 hours |
| Example 1 | no deterioration | no deterioration | no deterioration | texture deteriorated |
| Example 2 | no deterioration | no deterioration | no deterioration | no deterioration |
| Example 3 | no deterioration | no deterioration | no deterioration | smell deteriorated |
| Comparative Example 1 | no deterioration | no deterioration | texture/smell deteriorated | texture/smell deteriorated |
| Comparative Example 2 | no deterioration | no deterioration | texture deteriorated | texture/smell deteriorated |
| Comparative Example 3 | no deterioration | no deterioration | texture/smell deteriorated | texture/smell deteriorated |

As shown in Table 2, in the case of the sushi compositions prepared according to Examples 1 to 3 of the present invention, it can be seen that preservation was enhanced as compared to the sushi compositions prepared according to Comparative Examples 1 to 3.

Therefore, the sushi composition according to the present invention has excellent taste and texture, contains abundant nutrients, and exhibits excellent preservation by applying various ingredients in the form of a sauce or powder.

According to the present invention, a sushi composition, which has excellent taste and texture, contains abundant nutrients, and exhibits excellent preservation by applying various ingredients in the form of a sauce or powder, can be provided.

LIST OF REFERENCE NUMERALS

10: Sushi layer
11: Sushi mixture
12: Filling
20: Sauce layer
30: Powder layer

What is claimed is:
1. A sushi composition comprising:
a sushi layer;
a sauce layer formed on an upper surface of the sushi layer; and
a powder layer formed on a lower surface of the sushi layer,
wherein the sushi layer consists of a filling made of a protein component and a sushi mixture covering the filling,
the sauce layer contains sodium alginate and calcium chloride,
the protein component consists of one or more selected from the group consisting of meat and tofu,
the powder layer is made of an ingredient powdered after quick freezing at −55 to −45° C. and then freeze drying at 30 to 40° C. for 40 to 48 hours,
the powdered ingredient consists of one selected from the group consisting of fish flesh, roe, shellfish flesh, rolled omelet, shrimp flesh, and meat,
the sushi mixture consists of 100 parts by weight of a rice mix and 10 to 20 parts by weight of a sushi vinegar sauce,
the sushi vinegar sauce consists of 100 parts by weight of vinegar, 10 to 12 parts by weight of salt, 60 to 70 parts by weight of sugar, 10 to 20 parts by weight of citron juice, 5 to 10 parts by weight of kelp, 1 to 3 parts by weight of turmeric powder, and 1 to 3 parts by weight of cumin powder, and
the sushi vinegar sauce further contains a *Boehmeria nivea* extract in an amount of 1 to 3 parts by weight relative to 100 parts by weight of the vinegar, and
wherein the rice mix consists of 100 parts by weight of white rice and 50 to 150 parts by weight of konjac rice.

* * * * *